(12) United States Patent
Niederer et al.

(10) Patent No.: US 12,455,405 B2
(45) Date of Patent: Oct. 28, 2025

(54) TUNABLE OPTICAL DEVICE

(71) Applicant: Optotune Switzerland AG, Dietikon (CH)

(72) Inventors: David Andreas Niederer, Küttigen (CH); Christopher Laning, Windisch (CH); Roman Patscheider, Winterthur (CH)

(73) Assignee: OPTOTUNE SWITZERLAND AG, Dietikon (CH)

( * ) Notice: Subject to any disclaimer, the term of this patent is extended or adjusted under 35 U.S.C. 154(b) by 511 days.

(21) Appl. No.: 17/870,915

(22) Filed: Jul. 22, 2022

(65) Prior Publication Data
US 2023/0026802 A1 Jan. 26, 2023

(30) Foreign Application Priority Data

Jul. 23, 2021 (DE) ...................... 10 2021 119 208.0

(51) Int. Cl.
*G02B 3/14* (2006.01)
*G02B 7/02* (2021.01)

(52) U.S. Cl.
CPC ............... *G02B 3/14* (2013.01); *G02B 7/023* (2013.01); *G02B 7/026* (2013.01)

(58) Field of Classification Search
CPC .......... G02B 3/14; G02B 7/023; G02B 7/026; G02B 26/004
See application file for complete search history.

(56) References Cited

U.S. PATENT DOCUMENTS

| | | | |
|---|---|---|---|
| 2008/0170303 A1* | 7/2008 | Bieg | G02B 7/005 |
| | | | 359/811 |
| 2012/0012755 A1 | 1/2012 | Wang et al. | |
| 2018/0136372 A1* | 5/2018 | Patscheider | G02B 5/06 |
| 2019/0010423 A1 | 1/2019 | Saveyn et al. | |
| 2020/0020951 A1 | 1/2020 | Furusawa et al. | |

* cited by examiner

*Primary Examiner* — James C. Jones
(74) *Attorney, Agent, or Firm* — JMB Davis Ben-David

(57) ABSTRACT

Tunable optical device comprising an actuator, a transmission element, a mount and an optical component, wherein the optical component comprises a window member and a ring member, wherein an optical property of the optical component is adjustable by altering the position of the ring member with respect to the window member. The actuator is arranged to generate an actuation force along an axial direction, the transmission element is arranged to transmit the actuation force from the actuator to the optical component, the transmitted actuation force alters the position of the ring member with respect to the window member. The transmission element comprises a bridge portion and a meander portion, wherein the bridge portion couples the ring member to the actuator and the window member is attached to the mount, or the bridge portion couples the window member to the actuator and the ring member is attached to the mount. The meander portion couples the bridge portion to the mount, and a stiffness of the bridge portion is larger than a stiffness of the meander portion along the axial direction, and a stiffness of the meander portion in directions obliquely with respect to the axial direction is larger than the stiffness of the meander portion along the axial direction.

9 Claims, 2 Drawing Sheets

TUNABLE OPTICAL DEVICE

CROSS-REFERENCE TO RELATED APPLICATIONS

Benefit is claimed to German Patent Application No. 10 2021 119 208.0, filed on Jul. 23, 2021; the contents of which are incorporated by referenced herein in their entirety.

FIELD

Described herein is a tunable optical device that is arranged to controllably interact with electromagnetic radiation, in particular light, in a predefined manner. The tunable optical device may be arranged to deflect, focus, defocus, filter or shift electromagnetic radiation in a controllable manner.

BACKGROUND

A tunable optical device, in particular a tunable lens, is arranged to control properties of light by tuning. The tuning is performed by means of an actuation force, and for many applications it is required to control the optical properties in a highly precise manner. Thus, a tunable optical device is based on the consideration, that the actuation force which is transferred from the actuator to the optical component, must be very controlled in its direction, to avoid parasitic influence on the optical properties of the optical component. The tunable optical device described in the current disclosure address this consideration.

SUMMARY

The tunable optical device comprises an actuator which is arranged to transform electric power into mechanical force. The actuator may be a voice coil actuator, a piezo-electric actuator, a shape-memory-alloy (SMA) actuator or a reluctance actuator.

The tunable optical device comprises a transmission element which is coupled to the actuator and which is arranged to transmit the actuation force from the actuator to an optical component. The transmission element mechanically couples the actuator and the optical component.

The tunable optical device comprises the optical component. The optical component may be a tunable lens, a tunable prism, a beam shifting device or a tunable mirror. The tunable optical device comprises a mount which may be arranged to carry the actuator and the optical component.

The optical component comprises a window member and a ring member, wherein an optical property of the optical component is adjustable by altering the position of the ring member with respect to the window member. The optical property may be optical power, coma, astigmatism, an angle of deflection an angle of reflection.

The actuator is arranged to generate an actuation force along an axial direction. The actuation force is transmitted by means of the transmission element from the actuator to the optical component. The transmitted actuation force alters the position of the ring member with respect to the window member. In particular, the axial direction extends along the optical axis of the optical component.

The transmission element comprises a bridge portion and a meander portion. According to a first alternative, the bridge portion couples the ring member to the actuator and the window member is attached to the mount, and the ring member is displaced along the axial direction by means of the actuation force. According to a second alternative, the bridge portion couples the window member to the actuator and the ring member is attached to the mount, and the window member is displaced along the axial direction by means of the actuation force.

The meander portion couples the bridge portion to the mount. In particular, the meander portion is directly attached to the bridge portion and the mount.

A stiffness of the bridge portion along the axial direction is larger than a stiffness of the meander portion along the axial direction. In particular, the stiffness of the bridge portion in the axial direction is at least ten times, preferably at least 100 times, larger than a stiffness of the meander portion in the axial direction. Here and in the following, stiffness is the extent to which an object resists deformation in response to an applied force.

A stiffness of the meander portion in directions obliquely with respect to the axial direction is larger than the stiffness of the meander portion along the axial direction. For example, the stiffness of the meander portion in directions obliquely, in particular orthogonally, with respect to the axial direction is at least 50 times, preferably at least 100 times, higher than the stiffness of the meander portion along the axial direction.

A tunable optical device is based on the following considerations amongst others. The actuation force which is transferred from the actuator to the optical component must be very controlled in its direction, to avoid parasitic influence on the optical properties of the optical component.

The tunable optical device described herein utilizes a transmission element, which has specific mechanical properties which are defined by its stiffness. Advantageously, such transmission element allows to minimize parasitic changes, by limiting the movement of the ring member or the window member in directions obliquely with respect to the axial direction.

According to one embodiment, the meander portion and the bridge portion are fabricated in a one-piece manner. In particular, the entire transmission element is fabricated in a one-piece manner. For example, the meander portion and the bridge portion are fabricated from a sheet material by means of stamping, laser cutting or a subtractive fabrication process.

According to embodiment, the transmission element comprises a first and a second section, wherein the first section is electrically insulated from the second section. The first section and the second section are arranged to provide an electrical connection between the mount and the actuator respectively. For example, the first section comprises the bridge portion and the meander portion and the second section comprises a further bridge portion and a further meander portion. In particular, the actuator is a voice coil actuator, wherein a coil is fixedly attached to the transmission element and the transmission element provides electrical connection of the coil.

According to one embodiment, a thermally insulating structure couples the bridge portion to the actuator or optical component. In particular, the thermally insulating structure has a larger thermal resistance than the bridge portion. The thermally insulating structure may comprise a polymer or a ceramic material. For example, the thermally insulating material mechanically connects the bridge portion to the actuator, in particular the coil of the actuator. The thermally insulating structure may mechanically connect the bridge portion the optical component, in particular the ring member or the window member.

According to one embodiment, the transmission element consists of a non-magnetic material. In particular, paramagnetic, diamagnetic, and antiferromagnetic materials are considered as non-magnetic materials. In particular, only very small forces act between the transmission element and the magnetic field of the actuator. Thus, the interaction of the transmission element with the magnetic field of the actuator is neglectable in comparison to the forces between the coil and a magnet of the actuator. In particular, the transmission element consists of a material which is electrically conductive.

According to one embodiment the tunable lens comprises a liquid volume, wherein altering the relative position of the ring member with respect to the window member changes the shape of the liquid volume and thereby optical properties of the optical component. In particular, the optical component is a tunable lens, wherein the liquid volume is delimited by means of a primary membrane on a side opposing the window member. The ring member delimits the liquid volume laterally. The curvature of the primary membrane is adjustable, by altering the relative position of the ring member and the window member. The primary membrane provides an optical surface of the tunable lens, wherein the curvature of the primary membrane is changed when altering the relative position of the ring member and the window member. In particular, the optical property which is alters is the optical power of the tunable lens.

According to one embodiment the transmission element extends along a lateral plane circumferentially around the optical component, and the actuator extends along the lateral plane circumferentially around the optical component, wherein the lateral plane extends perpendicular with respect to the axial direction. For example, the first portion and the second portion of the transmission element extend along at least 90° and at most 180° around the optical component respectively. In particular, the transmission element and the optical component are not necessarily arranged in the same lateral plane.

The transmission element may have a stiffness along the axial direction, which is rotationally symmetric with respect to the optical axis. For example, along the circumference of the ring member, the stiffness of the transmission element in a direction along the optical axis is symmetric, preferably constant. Thus, the force required to deflect the ring member along the axial direction by a predefined amount is identical at opposing positions of the ring member with respect to the optical axis.

According to one embodiment the actuator comprises a magnet and a coil, the magnet and/or the coil extending in the lateral plane circumferentially around the optical component. The coil and the magnet may be ring-shaped respectively. In particular the ring-shaped coil may comprise multiple segments extending along a portion of a circular arc respectively, wherein a current may be applied to each segment of the coil individually. The ring-shaped agent may comprise multiple segments, wherein each of said segments extends along a portion of a circular arc around the optical component.

The transmission element, in particular the meander portion, may be arranged with in an inner circle defined by the coil. For example, the coil circumvents the transmission element, in particular the meander portion, seen in a top view along the optical axis.

The coil circumvents the magnet as seen in a top view along the optical axis. Both, the coil and the magnet may have ring-shaped geometry, wherein the magnet has a smaller geometry than the magnet. In particular, the coil circumvents the magnet completely in lateral directions.

According to one embodiment, the magnet is magnetized along the axial direction and a return structure is arranged to guide the magnetic field. The magnet, the return structure and the coil are arranged concentrically with respect to each other. The return structure is arranged to guide the magnetic field, so that the magnetic field extends through the coil in radial directions, wherein the radial directions extend perpendicularly with respect to the axial direction. The coil is wound around a winding axis, wherein the winding axis extends along the axial direction. When a current is applied to the coil, an actuation force along the axial direction is caused, wherein the direction of actuation force depends on the direction of the current in the coil.

According to on embodiment, the window member is attached to the ring member by means of a secondary membrane. The primary membrane is attached to the ring member on a side opposed to window member, wherein the primary membrane forms an optical surface of the optical component. The ring member delimits the liquid volume laterally. The primary membrane delimits the liquid volume along the axial direction on a first side and the secondary membrane or the window member delimits the liquid volume along the axial direction on a second side, wherein the first side is opposed to the second side.

BRIEF DESCRIPTION OF THE DRAWINGS

Further advantages and advantageous refinements and developments of the tunable optical device result from the following exemplary embodiments illustrated in connection with the figures.

Elements that are the same, of the same type or have the same effect are provided with the same reference symbols in the figures. The figures and the proportions of the elements shown in the figures are not to be regarded as being to scale. Rather, individual elements can be shown exaggeratedly large for better representability and/or for better understanding.

DETAILED DESCRIPTION

Figure 1:
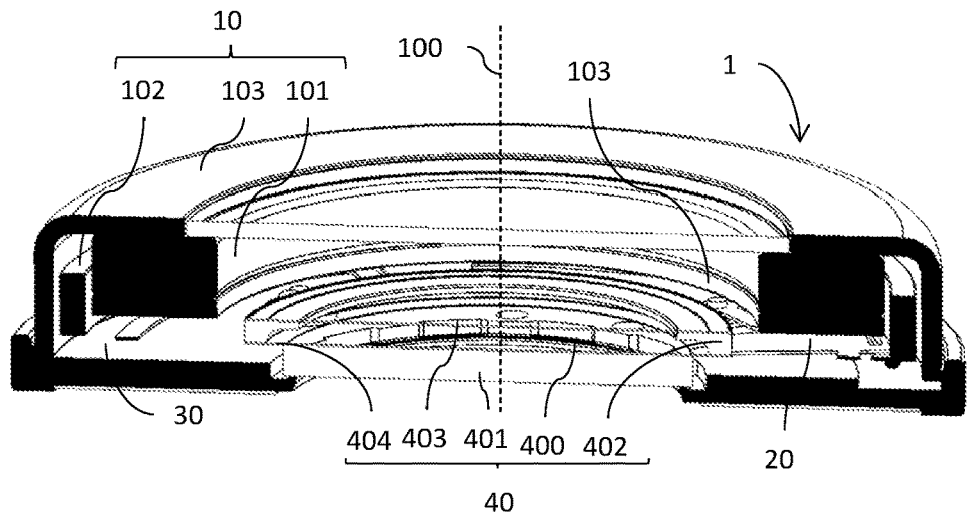
FIGS. 1, 2 and 3 show an exemplary embodiment of a tunable optical device in a schematic sectional view respectively

FIG. 1 shows an exemplary embodiment of a tunable optical device 1 in a schematic sectional view. The tunable optical device 1 comprises an actuator 10, a transmission element 20, a mount 30 and an optical component 40. The optical component 40 comprises a window member 401 and a ring member 402, wherein an optical property of the optical component 40 is adjustable by altering the position of the ring member 402 with respect to the window member 401. The window member 404 is attached to the ring member by means of a secondary membrane 404. A primary membrane 403 is attached to the ring member 202 on a side opposing the secondary membrane 404. The ring member 202 delimits a liquid volume 400 in lateral directions and the primary 403 and secondary 404 membrane delimit the liquid volume along the axial direction. Here and in the following axial directions extend long the optical axis 100 of the tunable optical device and lateral directions extend perpendicular with respect to the axial directions.

The actuator 10 is arranged to generate an actuation force along the axial direction. The actuator is a voice coil actuator, comprising a coil 102, a magnet 101 and a return structure 103. The coil 102 and the magnet 101 are ring-shaped and are arranged concentrically. The magnet 101 and the coil 102 extend in a lateral plane circumferentially around the optical component 40. The lateral plane extends perpendicular with respect to the optical axis 100. The magnet 101 is magnetized along the axial direction. The return structure 103 guides the magnetic field, so that the field extends along lateral directions through the coil 102. In particular, the magnetic field extends in radial directions through the coil, wherein radial directions extend orthogonally with respect to the optical axis 100. In particular, the transmission element 20 consists of a non-magnetic material.

The transmission element 20 is arranged to transmit the actuation force from the actuator 10 to the optical component 40. The transmission element 20 extends along the lateral plane circumferentially around the optical component 40, and the actuator 10 extends along the lateral plane circumferentially around the transmission element 20.

The transmitted actuation force alters the position of the ring member 402 with respect to the window member 401 along the axial direction. Altering the relative position of the ring member 402 and the window member 401 along the axial direction displaces liquid in the liquid volume 400 and changes the curvature of the primary membrane 403. The change in the curvature of the primary membrane 403 alters an optical property of the tunable optical device 1, because the primary membrane is an optical surface 40a of the optical component 40. In the present embodiment the optical property is the optical power of the optical component 40. In particular the optical property may be prism, coma or astigmatism.

Figure 2:
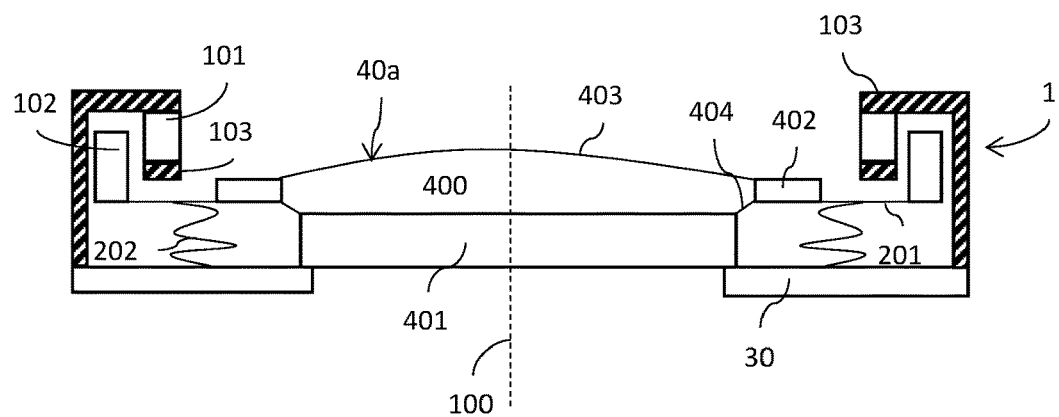

FIG. 2 shows an exemplary embodiment of a tunable optical device 1 in a schematic sectional view. The actuator 10 is a voice-coil actuator comprising the magnet 101 and the coil 102. The coil is fixedly attached to the transmission element 20 and the magnet is fixedly attached to the mount 30. The actuator 10 is arranged to move the coil 102 with respect to the mount 30.

The transmission element comprises a bridge portion 201 and a meander portion 202. The bridge portion 201 couples the ring member 202 to the coil 102. The actuation force is transferred from the coil 102 to the ring member 202 by means of the bridge portion 201. The meander portion 202 couples the bridge portion 201 to the mount 30. The meander portion 202 provides a flexible electrical connection to the coil 102. The window member 401 is fixedly attached to the mount 30.

A stiffness of the bridge portion 201 along the axial direction is larger than a stiffness of the meander portion 202 along the axial direction. For example, the stiffness of the bridge portion 201 along the axial direction is at least 10 times larger, preferably at least 100 times larger, than a stiffness of the meander portion 202 along the axial direction. Thus, the meander portion provides a flexible electrical connection between the mount 30 and the coil 102.

Preferably, the impact of the meander portion 202 on the motion of the coil 101 along the axial direction is neglectable.

A stiffness of the meander portion 202 in directions obliquely with respect to the axial direction is larger than the stiffness of the meander portion 202 along the axial direction. For example, the stiffness of the meander portion 202 in directions obliquely, in particular orthogonally, with respect to the optical axis 100 is at least 50 times larger, preferably at least 100 times larger than the stiffness of the meander portion 202 along the optical axis 100. Advantageously, the meander portion 202 reduces the deflection of the ring member in lateral directions, which results in reduced parasitic changes of optical properties.

Figure 3:
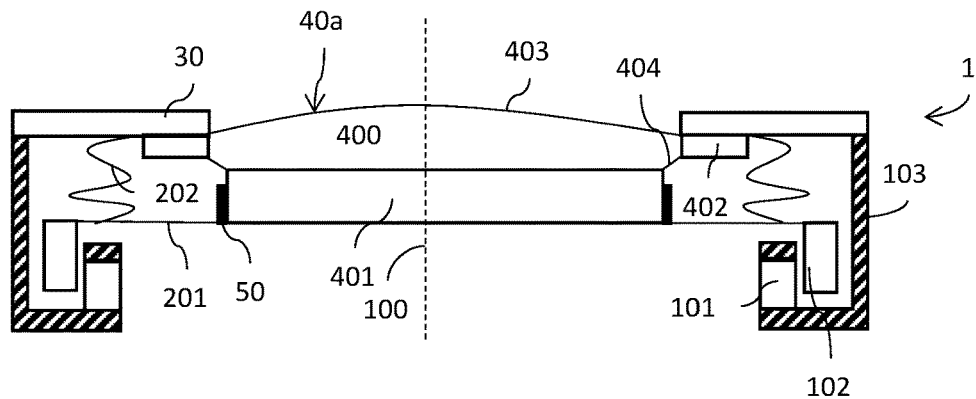

FIG. 3 shows an exemplary embodiment of a tunable optical device 1 in a schematic sectional view. The actuator 10 is a voice-coil actuator comprising the magnet 101 and the coil 102. The embodiment shown in FIG. 3 differs from the embodiment shown in FIG. 2 in the bridge portion 201 coupling the window member 401 to the actuator 10 and the ring member 402 being attached to the mount 30. Thus, the movement of the coil 102 is transmitted through the bridge portion 201 to the window member 401. In particular, the window member 401 may be integrally formed with the transmission element 20 and the ring member 402 may be integrally formed with the mount 30.

Furthermore, the embodiment shown in FIG. 3 differs from the embodiment shown in FIG. 2 in that a thermally insulating structure 50 couples the bridge portion 201 to the optical component. The thermally insulating structure has a larger thermal resistance than the bridge portion. Thermally insulating structure may consist of a ceramic or a polymer material. The thermally insulating structure 500 reduces the heat transferred from the coil 102 via the transmission element 20 to the optical component 40. Advantageously, the thermal insulating structure 50 reduces parasitic thermal effects in the optical component 40.

Figure 4:
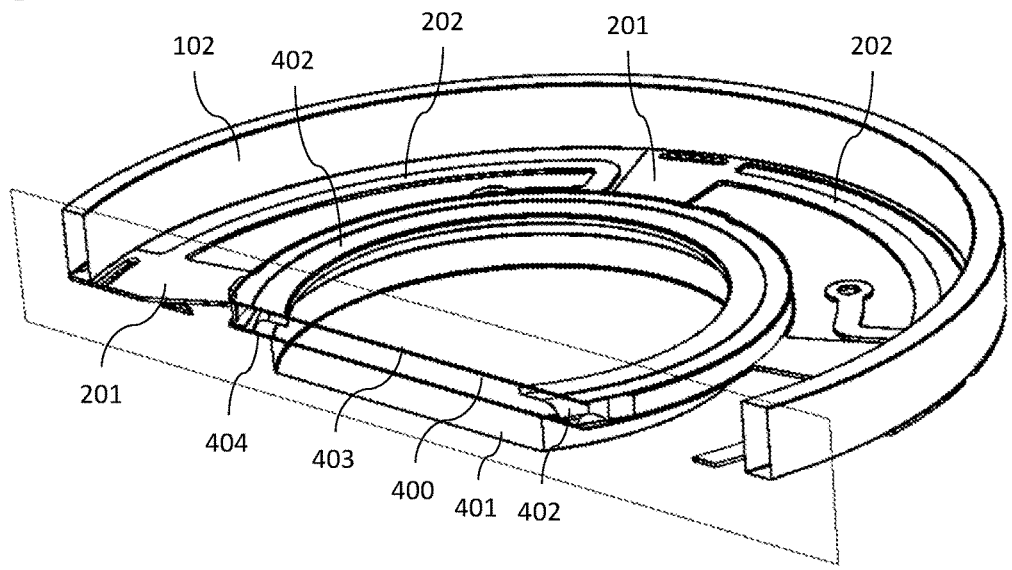
FIG. 4 shows an exemplary embodiment of an optical component, a transmission element and a coil of a tunable optical device.

FIG. 4 shows an exemplary embodiment of an optical component 40, a transmission element 20 and a coil 102 of a tunable optical device 1 in a schematic perspective view with a sectional plane. The transmission element 20 is attached to the ring member 402. Multiple bridge portions 201 transmit the actuation force from the coil 102 to the ring member 402. The transmission element comprises multiple meander portions 202, which are attached to one of the bridge portions and to the mount 30 respectively.

Figure 5:
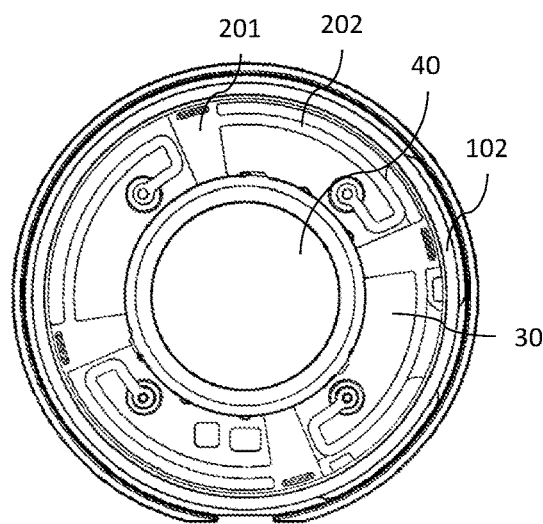
FIGS. 5 and 6 show an exemplary embodiment of a transmission element in a schematic top view.

FIG. 5 shows an exemplary embodiment of a transmission element 20 and a mount 30 in a schematic top view. The meander portions 202 are connected to the mount 30, wherein at least two of the meander portions provide electrical connection to the coil 102.

Figure 6:
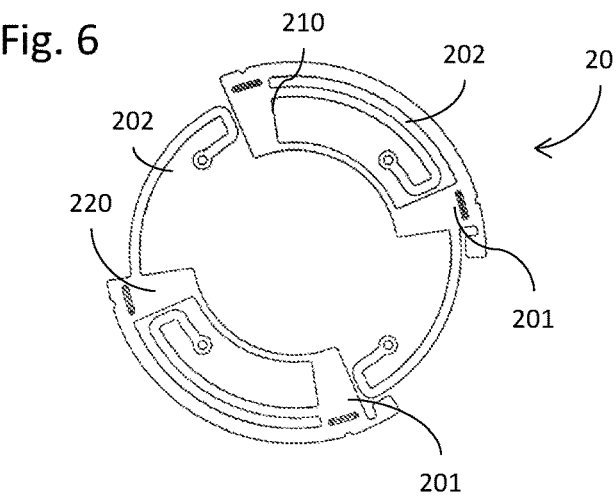

FIG. 6 shows an exemplary embodiment of a transmission element 20 in a schematic top view. The meander portion 202 and the bridge portion 201 are fabricated in a one-piece manner. For example, the meander and the bridge portion are fabricated from a common sheet material by laser cutting or stamping. The transmission element 20 comprises a first 210 and a second 220 section, wherein the first section 210 is electrically insulated from the second section 220. The first section 210 and the second section 220 provide an electrical connection between the mount 30 and the actuator 10, in particular the coil 102, respectively. The first section 210 comprises a bridge portion 201 and a meander portion 202, and the second section comprises a further bridge portion 201 and a further meander portion 202. In particular, the first section and the second section extend symmetrically around the optical component 40.

The invention is not restricted to the exemplary embodiments by the description based on these. Rather, the invention includes any new feature and any combination of features, which in particular includes any combination of features in the claims, even if this feature or this combination itself is not explicitly specified in the claims or exemplary embodiments.

LIST OF REFERENCE SIGNS

1 Tunable optical device
10 actuator
100 Optical axis
101 Magnet
102 Coil
103 Return structure
20 Transmission element
201 Bridge portion
202 Meander portion
210 First section
220 Second section
30 Mount
40 Optical component
401 Window member
402 Ring member
403 Primary membrane
404 Secondary membrane
40a Optical surface
50 Insulating structure

We claim:

1. Tunable optical device comprising an actuator, a transmission element, a mount and an optical component, wherein
the optical component comprises a window member and a ring member, wherein an optical property of the optical component is adjustable by altering the position of the ring member with respect to the window member,
the actuator is arranged to generate an actuation force along an axial direction,
the transmission element is arranged to transmit the actuation force from the actuator to the optical component,
the transmitted actuation force alters the position of the ring member with respect to the window member,
the transmission element comprises a bridge portion and a meander portion,
wherein
the bridge portion couples the ring member to the actuator and the window member is attached to the mount, or
the bridge portion couples the window member to the actuator and the ring member is attached to the mount,
the meander portion couples the bridge portion to the mount,
a stiffness of the bridge portion is larger than a stiffness of the meander portion along the axial direction, and
a stiffness of the meander portion in directions obliquely with respect to the axial direction is larger than the stiffness of the meander portion along the axial direction, and
a thermally insulating structure couples the bridge portion to the actuator or to the optical component.

2. Tunable optical device according to claim 1, wherein the meander portion and the bridge portion are fabricated in a one-piece manner.

3. Tunable optical device according to claim 1, wherein the transmission element comprises a first and a second section,
the first section is electrically insulated from the second section,
the first section and the second section provide an electrical connection between the mount and the actuator respectively.

4. Tunable optical device according to claim 1, wherein the transmission element consists of a non-magnetic material.

5. Tunable optical device according to claim 1, comprising a liquid volume, wherein altering the relative position of the ring member with respect to the window member changes the shape of the liquid volume and thereby optical properties of the optical component.

6. Tunable optical device according to claim 1, wherein the transmission element extends along a lateral plane circumferentially around the optical component, and the actuator extends along the lateral plane circumferentially around the optical component, wherein the lateral plane extends perpendicular with respect to the axial direction.

7. Tunable optical device according to claim 6, wherein the actuator comprises a magnet and a coil,
the magnet and/or the coil extending in the lateral plane circumferentially around the optical component.

8. Tunable optical device according to claim 7, wherein the magnet is magnetized along the axial direction and a return structure is arranged to guide the magnetic field, wherein the magnetic field extends through the coil in radial directions, wherein the radial directions extend perpendicularly with respect to the axial direction.

9. Tunable optical device according to claim 8, wherein
the window member is attached to the ring member by means of a secondary membrane,
a primary membrane is attached to the ring member on a side opposed to window member, wherein the primary membrane forms an optical surface of the optical component,
the liquid volume is laterally delimited by means of ring member,
the primary membrane delimits the liquid volume along the axial direction on a first side, and
the secondary membrane or the window member delimits the liquid volume along the axial direction on a second side, wherein the first side is opposed to the second side.

* * * * *